United States Patent
Hon et al.

(10) Patent No.: US 11,927,103 B2
(45) Date of Patent: Mar. 12, 2024

(54) TURBINE ENGINE AND METHOD OF COOLING

(71) Applicant: General Electric Company, Schenectady, NY (US)

(72) Inventors: Robert Charles Hon, Fort Mitchell, KY (US); Amid Ansari, Mason, OH (US); Michael Scott McCambridge, Symmes Township, OH (US); Thomas Earl Gillingham, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 130 days.

(21) Appl. No.: 17/372,770

(22) Filed: Jul. 12, 2021

(65) Prior Publication Data
US 2022/0049619 A1    Feb. 17, 2022

Related U.S. Application Data

(63) Continuation of application No. 15/163,289, filed on May 24, 2016, now Pat. No. 11,686,212.

(51) Int. Cl.
| | |
|---|---|
| *F01D 19/02* | (2006.01) |
| *F01D 21/00* | (2006.01) |
| *F01D 25/12* | (2006.01) |
| *F01D 25/34* | (2006.01) |
| *F02C 7/12* | (2006.01) |

(Continued)

(52) U.S. Cl.
CPC .............. *F01D 19/02* (2013.01); *F01D 21/00* (2013.01); *F01D 25/12* (2013.01); *F01D 25/34* (2013.01); *F02C 7/12* (2013.01); *F02C 7/18* (2013.01); *F02C 7/268* (2013.01); *F02C 7/277* (2013.01); *F05D 2220/323* (2013.01); *F05D 2260/85* (2013.01); *F05D 2270/112* (2013.01);

(Continued)

(58) Field of Classification Search
CPC .......... F01D 19/02; F01D 21/00; F01D 25/12; F02C 7/12; F05D 2270/304; F05D 2260/85; F05D 2270/3032; F05D 2270/112; F05D 2220/323
See application file for complete search history.

(56) References Cited

U.S. PATENT DOCUMENTS

| | | | |
|---|---|---|---|
| 5,123,241 A | 6/1992 | Lotan | |
| 6,104,157 A * | 8/2000 | Kramer | .................. F02N 11/106 318/431 |

(Continued)

FOREIGN PATENT DOCUMENTS

| | | |
|---|---|---|
| CN | 101197520 A | 6/2008 |
| CN | 101307723 A | 11/2008 |

(Continued)

*Primary Examiner* — Christian Chace
*Assistant Examiner* — Katherine Marie Fitzharris
(74) *Attorney, Agent, or Firm* — Dority & Manning, P.A.

(57) ABSTRACT

A method of mitigating thermal rotor bow in a rotor assembly of a turbine engine may include performing a plurality of motoring cycles. The plurality of motoring cycles may include receiving feedback on a temperature within a turbine engine in a post-shutdown state, actuating a starter motor when the temperature is greater than a predetermined threshold, operating the starter motor for a motoring time to exhaust some residual heat from the turbine engine, and shutting down the starter motor after the motoring time.

20 Claims, 2 Drawing Sheets

(51) Int. Cl.
*F02C 7/18* (2006.01)
*F02C 7/268* (2006.01)
*F02C 7/277* (2006.01)

(52) U.S. Cl.
CPC ............ *F05D 2270/3032* (2013.01); *F05D 2270/304* (2013.01); *Y02T 50/60* (2013.01)

(56) References Cited

U.S. PATENT DOCUMENTS

| | | |
|---|---|---|
| 7,941,281 B2 | 5/2011 | Rai et al. |
| 8,396,689 B2 | 3/2013 | Pfeifer et al. |
| 8,666,580 B2 | 3/2014 | Hashimoto |
| 8,773,049 B2 | 7/2014 | Ramamurthy et al. |
| 8,820,046 B2 | 9/2014 | Ross et al. |
| 8,918,264 B2 | 12/2014 | Jegu et al. |
| 9,108,641 B2 | 8/2015 | Yone et al. |
| 2003/0191565 A1 | 10/2003 | Ostrom et al. |
| 2008/0245051 A1* | 10/2008 | Skelton ................ F01D 25/125 60/39.83 |
| 2009/0110541 A1 | 4/2009 | Southwick et al. |
| 2010/0189551 A1 | 7/2010 | Ballard, Jr. et al. |
| 2010/0287944 A1 | 11/2010 | Draper et al. |
| 2013/0091850 A1 | 4/2013 | Francisco |
| 2014/0030092 A1 | 1/2014 | Heinig et al. |
| 2014/0147245 A1 | 5/2014 | Payne |
| 2015/0167553 A1 | 6/2015 | Nesdill et al. |
| 2017/0234238 A1 | 8/2017 | Schwarz et al. |
| 2018/0306158 A1* | 10/2018 | Books .................. F02N 11/108 |
| 2018/0355764 A1* | 12/2018 | Clauson ................ F01D 21/20 |

FOREIGN PATENT DOCUMENTS

| | | |
|---|---|---|
| CN | 104421001 A | 3/2015 |
| EP | 2305986 A2 | 4/2011 |
| WO | WO95/27655 A1 | 10/1995 |
| WO | WO2016/069303 A1 | 5/2016 |

* cited by examiner

TURBINE ENGINE AND METHOD OF COOLING

CROSS-REFERENCE TO RELATED APPLICATIONS

This application is a continuation of U.S. application Ser. No. 15/163,289, filed May 24, 2016, the contents of which is incorporated herein by reference in its entirety as if set forth verbatim.

BACKGROUND

The present disclosure relates generally to turbine engines and, more specifically, to systems and methods of mitigating the formation of thermal rotor bow in turbine engines.

Turbine engines, such as turbofan engines, experience several different phases of operation including, but not limited to, startup to idle speed, warmup, acceleration to higher power and speed for takeoff, climb, cruise, steady-state, deceleration to lower speed and power for descent, landing and taxi, shutdown, and cool-down. Turbine engines may cycle through the different phases of operation several times a day depending on the use of the aircraft in which the turbine engines are attached. For example, a commercial passenger aircraft typically shuts down its engines in between flights as passengers disembark from the aircraft. As such, residual heat remains in the aircraft's engines, which can cause a phenomenon known as thermal rotor bow. Thermal rotor bow is generally defined by deformation in the rotating and stationary components of the turbine engine. Deformation in the components of the turbine engine can result in contact-related damage between the rotating and stationary components of the turbine engine during engine startup, thereby reducing the service life, performance, and operability of the turbine engine.

Thermal rotor bow is especially prominent at times after engine shutdown, and before the engine is allowed to fully cool. Moreover, many known turbine engines are unable to naturally mitigate thermal rotor bow during startup as the design of modern commercial turbofans shifts towards having higher bypass ratios and greater length-to-diameter ratios, as well as tighter clearances between rotors and stators of the engine.

DRAWINGS

These and other features, aspects, and advantages of the present disclosure will become better understood when the following detailed description is read with reference to the accompanying drawings in which like characters represent like parts throughout the drawings, wherein.

Figure 1:
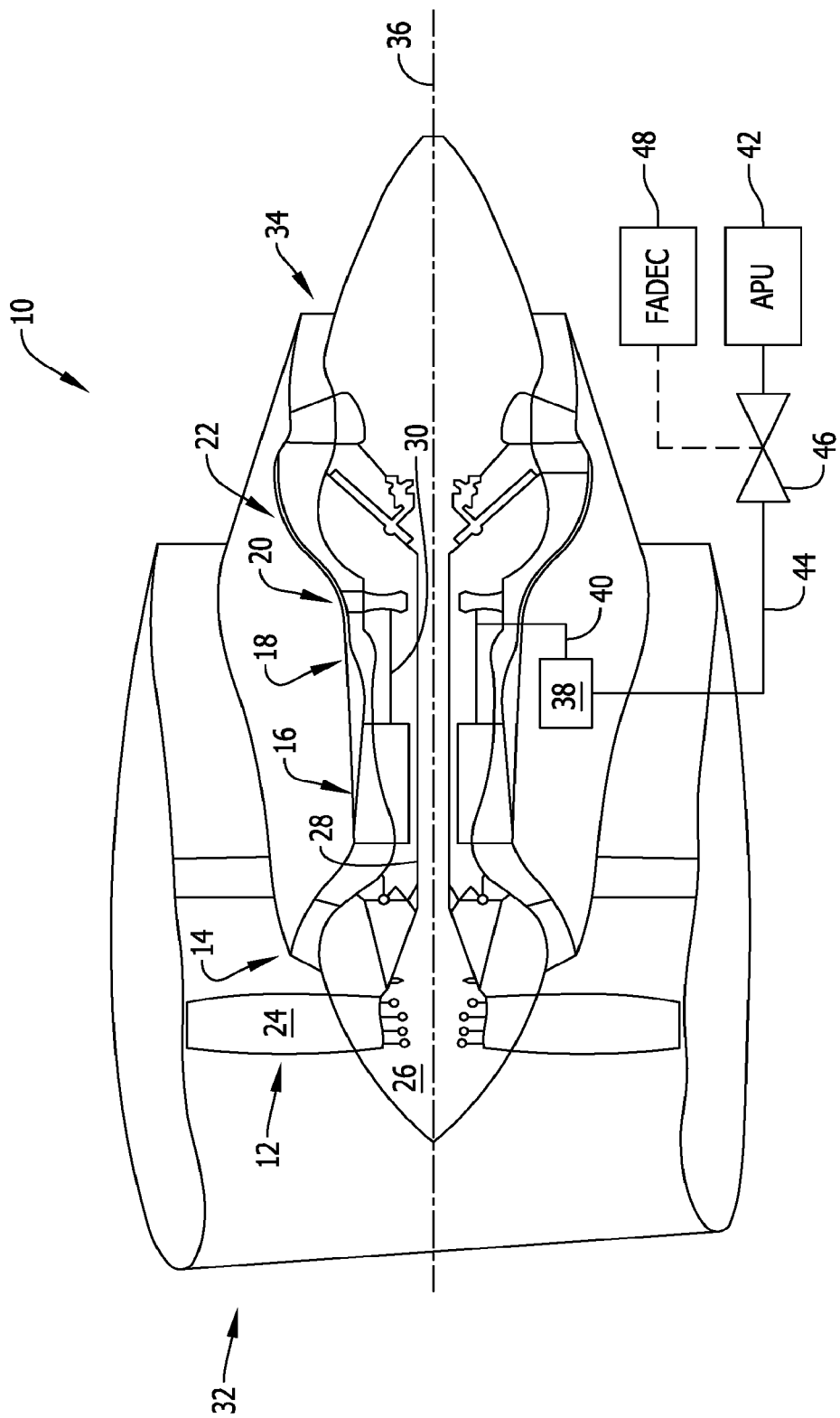
FIG. 1 is a schematic illustration of an exemplary turbine engine.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged. Such ranges are identified and include all the sub-ranges contained therein unless context or language indicates otherwise.

As used herein, the terms "axial" and "axially" refer to directions and orientations that extend substantially parallel to a centerline of the turbine engine. Moreover, the terms "radial" and "radially" refer to directions and orientations that extend substantially perpendicular to the centerline of the turbine engine. In addition, as used herein, the terms "circumferential" and "circumferentially" refer to directions and orientations that extend arcuately about the centerline of the turbine engine.

As used herein, the terms "processor" and "computer," and related terms, e.g., "processing device," "computing device," and "controller" are not limited to just those integrated circuits referred to in the art as a computer, but broadly refers to a microcontroller, a microcomputer, a programmable logic controller (PLC), and application specific integrated circuit, and other programmable circuits, and these terms are used interchangeably herein. In the embodiments described herein, memory may include, but it not limited to, a computer-readable medium, such as a random access memory (RAM), a computer-readable non-volatile medium, such as a flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

Further, as used herein, the terms "software" and "firmware" are interchangeable, and include any computer program storage in memory for execution by personal computers, workstations, clients, and servers.

As used herein, the term "non-transitory computer-readable media" is intended to be representative of any tangible computer-based device implemented in any method of technology for short-term and long-term storage of information, such as, computer-readable instructions, data structures, program modules and sub-modules, or other data in any device. Therefore, the methods described herein may be encoded as executable instructions embodied in a tangible, non-transitory, computer-readable medium, including, without limitation, a storage device and/or a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including without limitation, volatile and non-volatile media, and removable and non-removable media such as firmware, physical and virtual storage, CD-ROMS, DVDs, and any other digital source such as a network or the Internet, as well as yet to be developed digital means, with the sole exception being transitory, propagating signal.

Embodiments of the present disclosure relate to systems and methods for use in mitigating the formation of thermal rotor bow in a turbine engine. More specifically, the systems and methods described herein exhaust residual heat from within the turbine engine after shutdown to reduce a thermal imbalance therein, thereby partially or fully inhibiting the formation of thermal rotor bow. The residual heat is exhausted from within the turbine engine by selectively operating a starter motor of the turbine engine after shutdown. The starter motor rotates the rotor assembly of the turbofan engine without the aid of combustion such that the turbine engine is allowed to cool in a faster and more efficient manner. As such, the systems and methods described herein provide an automatic post-flight mitigation procedure that reduces the occurrence of thermal rotor bow. Moreover, while described in the context of a turbofan engine, it should be understood that the systems and methods described herein are also applicable to turboprop engines, turboshaft engines, turbojet engines, and any other turbine engine where thermal rotor bow needs to be mitigated.

FIG. 1 is a schematic illustration of an exemplary turbine engine 10, such as a turbofan engine. Turbine engine 10 includes a fan assembly 12, a low pressure or booster compressor assembly 14, a high-pressure compressor assembly 16, and a combustor assembly 18. Fan assembly 12, booster compressor assembly 14, high-pressure compressor assembly 16, and combustor assembly 18 are coupled in flow communication. Turbine engine 10 also includes a high-pressure turbine 20 coupled in flow communication with combustor assembly 18 and a low-pressure turbine 22. Fan assembly 12 includes an array of fan blades 24 extending radially outward from a rotor disk 26. Low-pressure turbine 22 is coupled to fan assembly 12 and booster compressor assembly 14 through a first drive shaft 28, and high-pressure turbine 20 is coupled to high-pressure compressor assembly 16 through a second drive shaft 30. Turbine engine 10 has an intake 32 and an exhaust 34. Turbine engine 10 further includes a centerline 36 about which fan assembly 12, booster compressor assembly 14, high-pressure compressor assembly 16, and turbines 20 and 22 rotate.

In operation, air entering turbine engine 10 through intake 32 is channeled through fan assembly 12 towards booster compressor assembly 14. Compressed air is discharged from booster compressor assembly 14 towards high-pressure compressor assembly 16. Highly compressed air is channeled from high-pressure compressor assembly 16 towards combustor assembly 18, mixed with fuel, and the mixture is combusted within combustor assembly 18. High temperature combustion gas generated by combustor assembly 18 is channeled towards turbines 20 and 22. Combustion gas is subsequently discharged from turbine engine 10 via exhaust 34.

Turbine engine 10 also includes a starter motor 38 and a starter shaft 40 coupled to the rotor assembly of turbine engine 10. More specifically, in one embodiment, starter shaft 40 is coupled to second drive shaft 30, and starter motor 38 provides motoring power to turbine engine 10 during startup thereof via starter shaft 40. As shown in FIG. 1, an auxiliary power unit (APU) 42 is coupled in flow communication with starter motor 38 via a pneumatic line 44. APU 42 selectively channels a flow of air towards starter motor 38 to facilitate actuating starter motor 38. Moreover, a starter valve 46 coupled along pneumatic line 44 is selectively operable to control the flow of air channeled towards starter motor 38. In an alternative embodiment, starter motor 38 receives airflow from a pneumatic power source other than APU 42 such as, but not limited to, an already-started turbine engine or a static pressure tank located onboard a ground cart, for example. In addition, starter motor 38 may be actuated by a power source other than pneumatic airflow, such as electricity.

In the exemplary embodiment, turbine engine 10 further includes an onboard computing device, such as a full authority digital engine control (FADEC) system 48. As will be explained in more detail below, FADEC system 48 is coupled, either wired or wirelessly, in communication with one or more subsystems or components of turbine engine 10 to control the operation thereof. In one embodiment, FADEC system 48 is also coupled in communication with starter valve 46. In an alternative embodiment, the subsystems or components of turbine engine 10 are controlled by a computing device onboard an aircraft (not shown) in which turbine engine 10 is attached.

Figure 2:
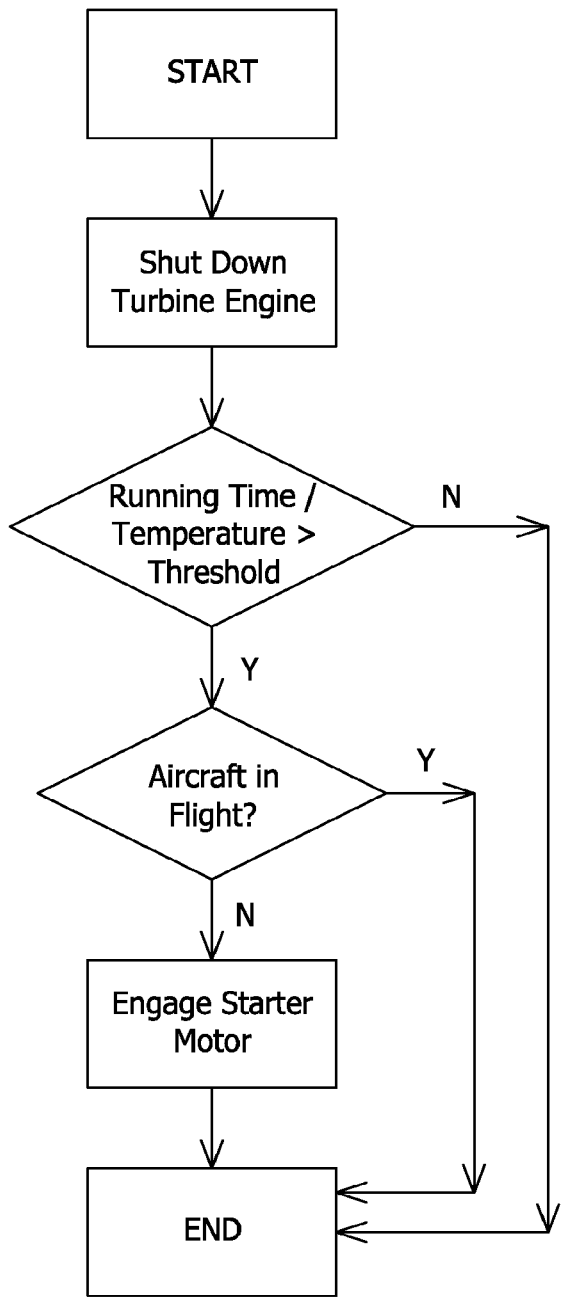
FIG. 2 is a logic diagram illustrating an exemplary method of operating the turbine engine shown in FIG. 1.

FIG. 2 is a logic diagram illustrating an exemplary method of cooling turbine engine 10 (shown in FIG. 1). More specifically, FADEC system 48 (shown in FIG. 1) operates turbine engine 10 in accordance with at least the logic shown in FIG. 2 to determine whether to implement post-shutdown mitigation of thermal rotor bow. As described above, the formation of thermal rotor bow in first drive shaft 28 and second drive shaft 30 (each shown in FIG. 1), for example, can occur after shutdown of turbine engine 10 and before turbine engine 10 has fully cooled. The determination of the existence of thermal rotor bow, and of whether a post-shutdown mitigation procedure is to be executed after engine shutdown is based on a variety of factors, as will be explained in more detail below.

For example, during a typical shutdown procedure, FADEC system 48 shuts down turbine engine 10. In one embodiment, FADEC system 48 shuts off a flow of fuel to combustor assembly 18 (shown in FIG. 1) after receiving a full stop command such that the rotational speed of turbine engine 10 decreases. FADEC system 48 then determines whether to actuate starter motor 38 such that residual heat is exhausted from turbine engine 10 based on any suitable feedback that enables the systems and methods to function as described herein. For example, FADEC system 48 determines whether to actuate starter motor 38 based on a running time of turbine engine 10 and/or a temperature within turbine engine 10. Moreover, in one embodiment, vibratory feedback of turbine engine 10 is used to determine how long to motor turbine engine 10 after engine shutdown.

Starter motor 38 is actuated at any time between engine shutdown and restart, and does not need to be actuated immediately after engine shutdown. In one embodiment, starter motor 38 is actuated as the rotational speed of turbine engine 10 decreases and/or at a preset time after turbine engine 10 receives a full stop command. The preset time is selected to ensure thermal rotor bow has not fully formed before actuating starter motor 38. For example, starter motor 38 can be actuated immediately after turbine engine 10 receives the full stop command (i.e., the preset time equals 0 seconds), or can be actuated after the preset time has passed between engine shutdown and motoring (i.e., the preset time is greater than 0 seconds). When turbine engine 10 receives the full stop command and time has passed between engine shutdown and a potential motoring time, starter motor 38 operates such that the rotor speed is less than a resonant rotational speed. As used herein, "resonant rotational speed" refers to a single rotational speed or a range of rotational speeds of the turbine engine that causes high dynamic vibration or displacement in the presence of a rotor imbalance such as thermal rotor bow. Moreover, starter motor 38 is actuatable for one or more motoring cycles between engine shutdown and restart to reduce unnecessary wear on starter motor 38. In addition, the rotors can be positioned in different resting orientations after each motoring cycle to reduce rotor bow formation in a single orientation.

As described above, FADEC system 48 receives feedback on a running time of turbine engine 10, and actuates starter motor 38 if the running time of turbine engine 10 is greater than a predetermined threshold. The longer the running time of turbine engine 10, the greater the likelihood that turbine engine 10 had reached steady state operating speeds and temperatures that will result in formation of thermal rotor bow upon engine shutdown. Moreover, additionally or alternatively, FADEC system 48 receives feedback on a temperature within turbine engine 10 post-shutdown, and actuates starter motor 38 if the temperature is greater than a predetermined threshold. The greater the temperature within turbine engine 10, the greater the likelihood that a thermal gradient capable of forming thermal rotor bow will form in turbine engine 10. If both the running time of turbine engine 10 is less than the predetermined threshold and the temperature within turbine engine 10 is less than the predetermined threshold, the post-shutdown mitigation procedure is not implemented and the logic ends. Alternatively, starter motor 38 motors turbine engine 10 every time turbine engine 10 is shutdown on the ground. In an alternative embodiment, FADEC system 48 also receives vibratory response feedback and starter motor 38 motors turbine engine 10 at a speed such that the vibratory response is less than a predetermined threshold.

In one embodiment, additional logic is included in FADEC system 48 to determine when to implement the post-shutdown mitigation procedure even if either the running time or the temperature is greater than the respective predetermined thresholds. More specifically, FADEC system 48 determines a flight status of an aircraft to which turbine engine 10 is attached, and actuates starter motor 38 only if the aircraft is not in flight. The additional logic is included to ensure starter motor 38 is not erroneously actuated if a malfunction occurs while the aircraft is in flight. If in flight, the residual heat within turbine engine 10 would be exhausted naturally and the post-shutdown mitigation procedure is not implemented. As such, FADEC system 48 actuates starter motor 38 if the aircraft is not in flight, and the logic ends if the aircraft is in flight.

In the exemplary embodiment, FADEC system 48 controls the operation of turbine engine 10 and associated starter components (i.e., starter motor 38, APU 42, and starter valve 46) if a determination is made to implement post-shutdown mitigation of thermal rotor bow. For example, APU 42 channels a flow of air through starter valve 46 for providing pneumatic power to starter motor 38, and FADEC system 48 selectively adjusts a position of starter valve 46 to control the flow of air channeled towards starter motor 38. Alternatively, starter motor 38 receives airflow from a pneumatic power source other than APU 42 such as, but not limited to, an already-started turbine engine or a static pressure tank located onboard a ground cart, for example. In addition, starter motor 38 may be actuated by a power source other than pneumatic airflow, such as electricity.

FADEC system 48 also determines how long starter motor 38 is to be operated once actuated to ensure the residual heat within turbine engine 10 is exhausted therefrom. In one embodiment, FADEC system 48 operates starter motor 38 for at least a preset motoring time, where the preset motoring time is selected to provide a sufficient amount of residual heat exhaustion from turbine engine 10. In addition, FADEC system 48 shuts down starter motor 38 such that starter motor 38 operates for an amount of time equal to or less than a predetermined duration. The predetermined duration is selected to reduce unnecessary wear to starter motor 38.

In some embodiments, FADEC system 48 receives feedback on the running time of turbine engine 10, and determines an amount of time for operating starter motor 38 based on the running time of turbine engine 10. For example, the longer the running time of turbine engine 10, the longer starter motor 38 is operated to provide sufficient residual heat exhaustion from turbine engine 10. Moreover, in one embodiment, FADEC system 48 receives feedback on the temperature within turbine engine 10, and operates starter motor 38 until the temperature is reduced to below a second predetermined threshold.

An exemplary technical effect of the system and methods described herein includes at least one of: (a) exhausting residual heat from a turbine engine to reduce the likelihood of formation of thermal rotor bow; (b) reducing contact-related wear between rotating and stationary components of the turbine engine caused as a result of thermal rotor bow; and (c) reducing startup time for the turbine engine.

Exemplary embodiments of a turbine engine and related components are described above in detail. The system is not limited to the specific embodiments described herein, but rather, components of systems and/or steps of the methods may be utilized independently and separately from other components and/or steps described herein. For example, the configuration of components described herein may also be used in combination with other processes, and is not limited to practice with only turbine engines and related methods as described herein. Rather, the exemplary embodiment can be implemented and utilized in connection with many applications where improving turbine engine performance is desired.

Although specific features of various embodiments of the present disclosure may be shown in some drawings and not in others, this is for convenience only. In accordance with the principles of embodiments of the present disclosure, any feature of a drawing may be referenced and/or claimed in combination with any feature of any other drawing.

Some embodiments involve the use of one or more electronic or computing devices. Such devices typically include a processor or controller, such as a general purpose central processing unit (CPU), a graphics processing unit (GPU), a microcontroller, a reduced instruction set computer (RISC) processor, an application specific integrated circuit (ASIC), a programmable logic circuit (PLC), and/or any other circuit or processor capable of executing the functions described herein. The methods described herein may be encoded as executable instructions embodied in a computer readable medium, including, without limitation, a storage device and/or a memory device. Such instructions, when executed by a processor, cause the processor to perform at least a portion of the methods described herein. The above examples are exemplary only, and thus are not intended to limit any way the definition and/or meaning of the term processor.

This written description uses examples to disclose the embodiments of the present disclosure, including the best mode, and also to enable any person skilled in the art to practice embodiments of the present disclosure, including making and using any devices or systems and performing any incorporated methods. The patentable scope of the embodiments described herein is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method of mitigating thermal rotor bow in a rotor assembly of a turbine engine, the method comprising:
   performing a plurality of motoring cycles, the plurality of motoring cycles comprising:
   receiving feedback on a temperature within a turbine engine in a post-shutdown state;
   during the post-shutdown state, initiating actuation of a starter motor when the temperature is greater than a predetermined threshold;
   operating the starter motor for a motoring time to exhaust some residual heat from the turbine engine; and
   shutting down the starter motor after the motoring time.

2. The method of claim 1, wherein the motoring time comprises a predetermined duration.

3. The method of claim 1, wherein operating the starter motor for the motoring time comprises operating the starter motor until the temperature is reduced below a second predetermined threshold.

4. The method of claim 1, comprising:
   receiving feedback on a running time of the turbine engine; and
   performing the plurality of motoring cycles if the running time of the turbine engine is greater than a predetermined running time-threshold.

5. The method of claim 1, wherein actuating the starter motor comprises:
   actuating the starter motor at a preset time after a full stop command corresponding to the post-shutdown state.

6. The method of claim 5, wherein the preset time permits thermal rotor bow to form before actuating the starter motor.

7. The method of claim 1, comprising:
   permitting thermal rotor bow to form when the temperature is less than the predetermined threshold.

8. The method of claim 1, comprising:
   determining how long to operate the starter motor once actuated to ensure residual heat within the turbine engine is exhausted.

9. The method of claim 8, comprising:
   determining the motoring time, the motoring time selected to exhaust some residual heat from the turbine engine.

10. The method of claim 9, comprising:
    determining a predetermined duration; and
    shutting down the starter motor after the motoring time, wherein the motoring time is less than or equal to the predetermined duration, and wherein the predetermined duration is selected to reduce unnecessary wear to the starter motor.

11. A method of mitigating thermal rotor bow in a rotor assembly of a turbine engine, the method comprising:
    receiving feedback on a temperature within a turbine engine in a post-shutdown state;
    during the post-shutdown state, initiating actuation of a starter motor at a first time when the temperature is greater than a predetermined threshold;
    operating the starter motor for a first motoring time to exhaust some residual heat from the turbine engine;
    shutting down the starter motor after the first motoring time;
    receiving additional feedback on the temperature within the turbine engine in the post-shutdown state after the first motoring time;
    actuating the starter motor at a second time when the temperature is greater than the predetermined threshold; and
    operating the starter motor for a second motoring time to exhaust some additional residual heat from the turbine engine; and
    shutting down the starter motor after the second motoring time.

12. A turbine engine comprising:
    a rotor assembly;
    a starter motor coupled to the rotor assembly; and
    a control system configured to perform a plurality of motoring cycles configured to mitigate thermal rotor bow in the rotor assembly, respective ones of the plurality of motoring cycles comprising:
    receiving feedback on a temperature within the turbine engine in a post-shutdown state; and
    during the post-shutdown state, initiating actuation of the starter motor when the temperature is greater than a predetermined threshold;
    operating the starter motor for a motoring time to exhaust some residual heat from the turbine engine; and
    shutting down the starter motor after the motoring time.

13. The turbine engine of claim 12, wherein the motoring time comprises a predetermined duration.

14. The turbine engine of claim 12, wherein operating the starter motor for the motoring time comprises operating the starter motor until the temperature is reduced below a second predetermined threshold.

15. The turbine engine of claim 12, wherein actuating the starter motor comprises:
    actuate the starter motor at a preset time after a full stop command corresponding to the post-shutdown state.

16. The turbine engine of claim 15, wherein the preset time permits thermal rotor bow to form before actuating the starter motor.

17. The turbine engine of claim 12, wherein the control system is configured to:
    permit thermal rotor bow to form when the temperature is less than the predetermined threshold.

18. The turbine engine of claim 12, wherein the control system is configured to:
    determine how long to operate the starter motor once actuated to ensure residual heat within the turbine engine is exhausted.

19. The turbine engine of claim 18, wherein the control system is configured to:
    determine the motoring time, the motoring time selected to exhaust some residual heat from the turbine engine.

20. The turbine engine of claim 19, wherein the control system is configured to:
    determine a predetermined duration; and shut down the starter motor after the motoring time, wherein the motoring time is less than or equal to the predetermined duration, and wherein the predetermined duration is selected to reduce unnecessary wear to the starter motor.

\* \* \* \* \*